United States Patent [19]
Evers et al.

[11] Patent Number: 6,036,096
[45] Date of Patent: Mar. 14, 2000

[54] MULTI-MODALLY GRIPPABLE DEVICE AND METHOD OF USE

[75] Inventors: Maaike L. Evers, San Francisco, Calif.;
Chaitanya Kanojia, Newton, Mass.;
Steven J. Meister, Atlanta, Ga.;
Gilbert Y. Wong, San Francisco, Calif.

[73] Assignee: Robotic Vision Systems, Inc., Canton, Mass.

[21] Appl. No.: 09/151,483

[22] Filed: Sep. 11, 1998

[51] Int. Cl.⁷ ...................................................... G06K 7/10
[52] U.S. Cl. .............................. 235/472.01; 235/462.45; 235/383
[58] Field of Search .............................. 235/383, 472.01, 235/462.45

[56] References Cited

U.S. PATENT DOCUMENTS

| | | | |
|---|---|---|---|
| 4,818,856 | 4/1989 | Matsushima et al. | 235/454 |
| 5,200,597 | 4/1993 | Eastman et al. | 235/455 |
| 5,237,162 | 8/1993 | Harden et al. | |
| 5,477,044 | 12/1995 | Aragon. | |
| 5,591,952 | 1/1997 | Kricheve et al. | |
| 5,606,160 | 2/1997 | Tani et al. | |
| 5,627,366 | 5/1997 | Katz | 250/234 |
| 5,656,803 | 8/1997 | Seo. | |
| 5,672,858 | 9/1997 | Li et al. | |
| 5,703,348 | 12/1997 | Suzuki et al. | |
| 5,979,757 | 11/1999 | Tracy et al. | 235/472.01 |

FOREIGN PATENT DOCUMENTS

| | | |
|---|---|---|
| 0 523632 | 6/1992 | European Pat. Off. |
| 0 818 725 | 7/1997 | European Pat. Off. |

OTHER PUBLICATIONS

PCT International Search Report, dated Jul. 21, 1999 PCT/US99/16502.

*Primary Examiner*—Harold I. Pitts
*Attorney, Agent, or Firm*—Leslie Payne

[57] ABSTRACT

A multi-modally grippable housing construction of improved ergonomic efficiency is disclosed, the construction including a head and a generally elongated handle assembly having a proximal portion coupled to a rear wall of the head to define a neck grippable by thumb and index fingers of an operator, the head having an exterior configuration extending rearwardly from the front end and being sized and shaped for facilitation of the cupping and holding of the head by an operator. Gripping of the housing about the neck, according to one preferred manner of gripping the housing, or cupping of the head according to another mode of grasping the housing construction, permits the operator, in the case of a symbology reader or imager, to address with ergonomic efficiency symbologies positioned, respectively, in vertical or horizontal orientation with respect to the operator.

20 Claims, 8 Drawing Sheets

MULTI-MODALLY GRIPPABLE DEVICE AND METHOD OF USE

BACKGROUND OF THE INVENTION

The present invention relates generally to a hand-holdable housing for devices used in the conduct of manual and repetitive operations. More particularly, it relates to ergonomically featured housings and devices grippable in multi-modal fashion for mitigation or alleviation of the discomfort, fatigue and stresses commonly associated with the performance of oft-repeated manipulations.

The need for ergonomic designs for the facilitation of dexterous operations is well known; and the need for such designs will be especially acute where the operations are particularly awkward or repetitive. It is desirable, for instance, in semi-automated and automated manufacturing operations to collect production and quality data regarding different articles of manufacture, for a variety of reasons, including the monitoring of various manufacturing and assembly steps, warehouse management, inventory control, shipping and receiving. In the data-collection field, hand-held imagers or readers have gained wide-spread acceptance. Typically, these imagers illuminate machine readable symbols, such as bar code, and read the illuminated data, whether the latter is represented in so-called one or two dimensional symbologies. Symbologies of, for example, the two-dimensional kind are preferred in many situations because they offer flexibility in terms of their different sizes and the fact that they can be positioned in a variety of different locations on the articles. However, the enhanced versatility offered by such symbologies creates a need for imagers that are correspondingly versatile in terms of reading the encoded data regardless of size, type and location of such symbologies.

Examples of these imagers are represented by U.S. Pat. No. : 5,200,597 issued to Eastman et al.; U.S. Pat. No. 5,477,044 issued to Aragon; U.S. Pat. No. 5,591,952 issued to Krichever et al.; U.S. Pat. No. 5,606,160 issued to Tani et al.; U.S. Pat. No. 5,627,366 issued to Katz; U.S. Pat. No. 5,656,803 issued to Seo; U.S. Pat. No. 5,672,858 issued to Li et al.; U.S. Pat. No. 5,703,348 issued to Suzuki et al. Despite the existence of numerous imagers, a desire exists for further improvements, particularly in areas of minimizing discomfort, fatigue and potential injury attributable to repetitive uses, as well as for enhancing overall ergonomic usage and improved versatility of operation. This is especially so when inspecting articles bearing a variety of symbologies in different forms and in differing locations on such articles. Such symbologies can be present, for example, on manufactured parts positioned on an assembly belt or other work station in a relatively horizontal position in relation to a worker intent on reading the symbology. Similarly, the symbology may appear in a relatively vertical orientation, requiring that the imager be held differently and as needed to accomplish the data-collection task.

Hand held imagers for the reading of symbologies are commonly in the nature of pistol devices that are especially suited to the reading of symbologies that are in a generally vertical plane. It will be appreciated that the utilization of a pistol-type imager for the reading of symbologies on parts positioned in a horizontal plane (e.g., on a table top, assembly belt or like work station) will necessitate considerable wrist flexure and associated discomfort as the leading portion of the device is aimed downwardly toward the horizontal plane.

Because of the variances at which the symbologies can be placed as well as their type, heretofore known imagers are not as versatile in terms of being able to be gripped by a user, especially in a manner that enhances ergonomic operation thereof.

SUMMARY OF THE INVENTION

In accordance with one preferred embodiment of the present invention, provision is made for a multi-modally hand-grippable device which facilitates its manipulation in various operational modes. The device includes a head portion; and a generally elongate handle having a proximal portion coupled to a rear wall of the head to define a neck grippable by thumb and index fingers of an operator and a distal end extending away from the head; the head having an exterior configuration extending rearwardly from a front end and which configuration is sized and shaped for multi-positional cupping and holding of the device by an operator.

In accordance with another preferred embodiment of the present invention, provision is made for a hand-held optical imager comprising: an optical illuminating and reading head having an optically transmissive window at a leading end portion thereof. Provision is made for means operable for optically reading symbology through the transmissive window. An elongate handle has a proximal portion that is coupled to a rear wall of the head and thereby defines a neck that is grippable by a thumb and index finger of a hand of an operator, and has a distal end extending away from the head. The head has an exterior configuration sized and shaped for facilitating cupping of the device by an operator holding it from any side thereof.

In an illustrated embodiment, at least a first switch element actuatable by a finger is located on one of the head and the handle. In this illustrated embodiment, the head includes a generally convex exterior configuration having a major gripping segment that extends from the neck and is generally spaced from and opposed to the handle.

In a preferred embodiment, provision is made for a first supporting surface at the distal end of the handle and a second supporting surface on a leading edge of the head; wherein the first and second supporting surfaces are able to support the imager on a generally planar surface in a manner whereby the handle can be grasped easily by an operator.

In another illustrated embodiment, provision is made for at least a supporting surface on a leading portion of the front wall that allows for the positioning of the imager on a flat surface.

In still another embodiment, provision is made for a second switch located adjacent a distal portion of the handle in close proximity to the first switch.

In still another embodiment, provision is made for a center of gravity located in a region of the neck in order to provide stability for holding by an operator. In such an embodiment, the handle is slanted with respect to the head so as to extend from the rear of the head portion on a side of the medial plane that is opposite the major gripping segment or portion. Further in this embodiment, provision is made for a generally convex section having a cup-shaped configuration.

The present invention contemplates a method of performing improved oft-repeated dexterous operations using a hand-holdable device in multi-modal gripping (e.g., pistol-grip or cupping) positions.

An object of the present invention is to provide a housing construction for use in holding at least an operable component, wherein the operation of such component is enhanced because the housing can be manipulated ergonomically in a variety of modes of operation.

An object of the present invention is to provide a novel and improved hand-held imager which is versatile in operation and can be used for illuminating and/or reading machine-readable symbologies.

Another object is to provide a hand-held imager that facilitates ergonomic usage.

The above and further objects and scope of the present invention will become apparent following reading a detailed description of the invention when taken in conjunction with the accompanying drawings wherein like parts are indicated by like reference numerals throughout the several views.

DETAILED DESCRIPTION OF THE INVENTION

Figure 1:
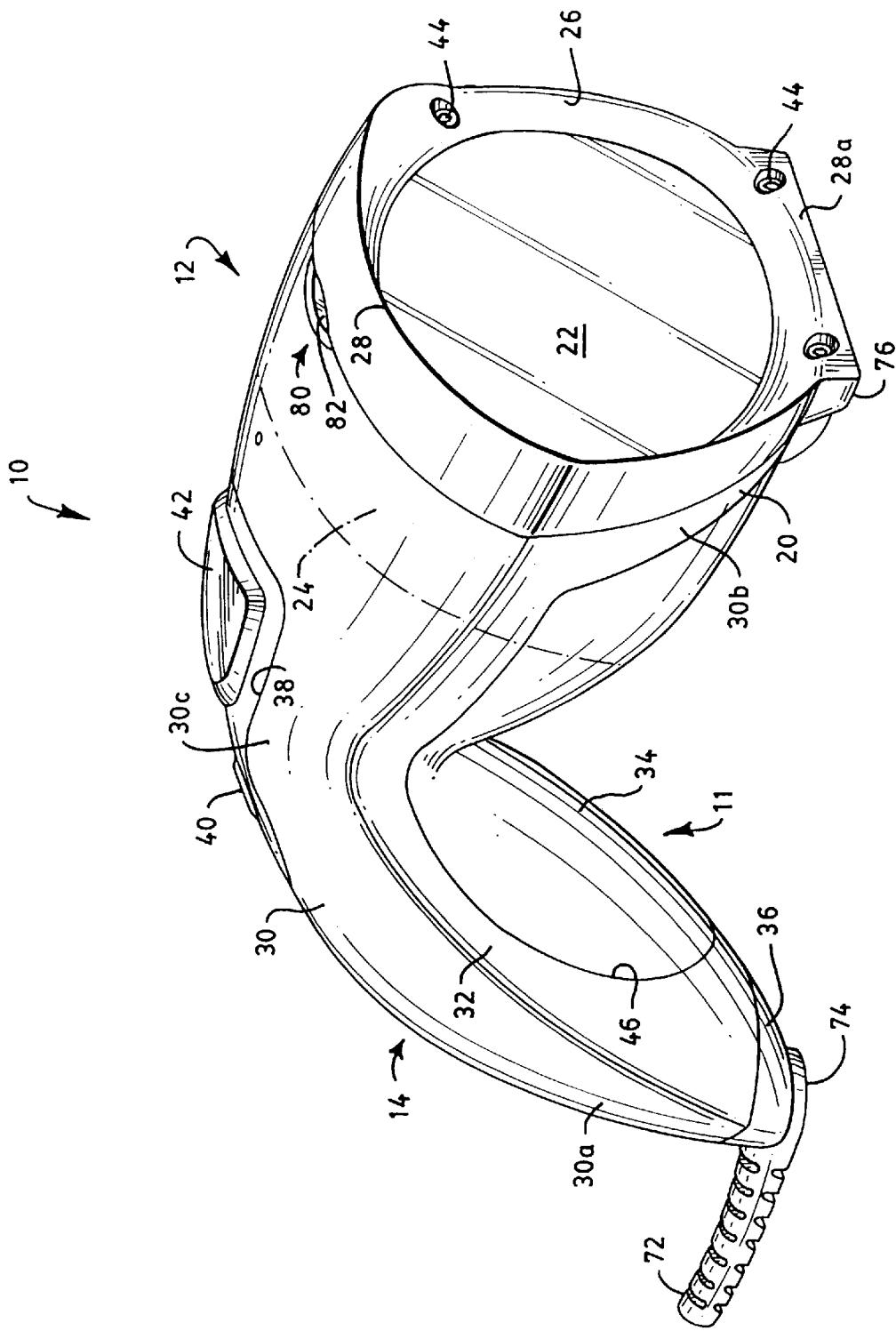
FIG. 1 is a left perspective view of a hand-held imager comprising one preferred embodiment of the present invention.
Figure 2:
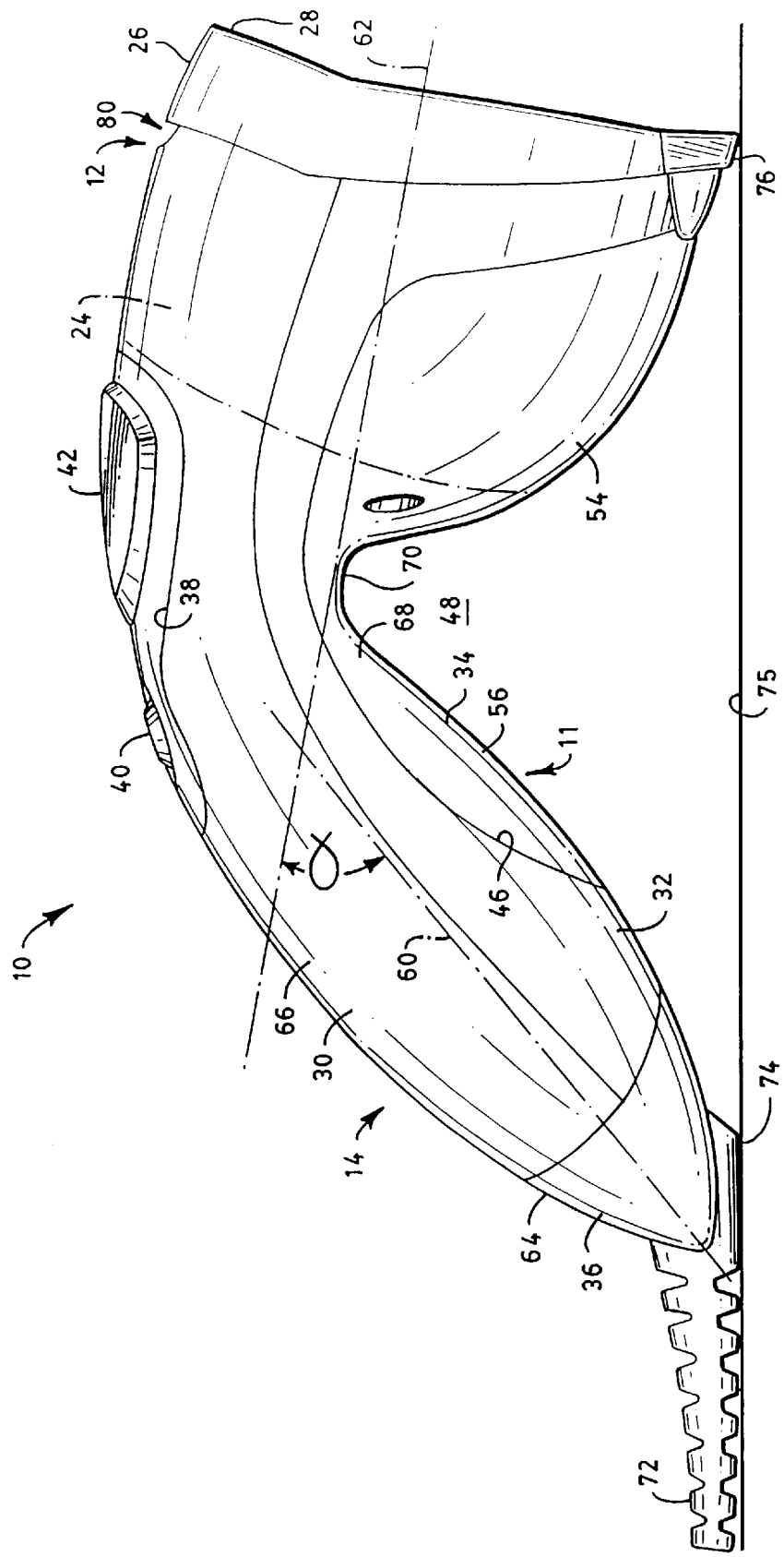
FIG. 2 is a right side elevation view of the imager of FIG. 1.

Referring now to the drawings in detail, there is shown for illustrative purposes in FIGS. 1–7, one preferred embodiment of the present invention. Provision is made for a hand-held electro-optical reader or imager 10, such as is described in: the copending application of Luis Figarella, et al., for Optical Focusing Device and Method, Attorney Docket No. 8357, filed of even date; and the copending application of Steven Fantone, et al., for Variable—Focus Optical System, Attorney Docket No. 8361. Details of the construction and operation of all components thereof are incorporated herein and made a part hereof. Only those components necessary for understanding the present invention will be set forth.

Figure 3A:
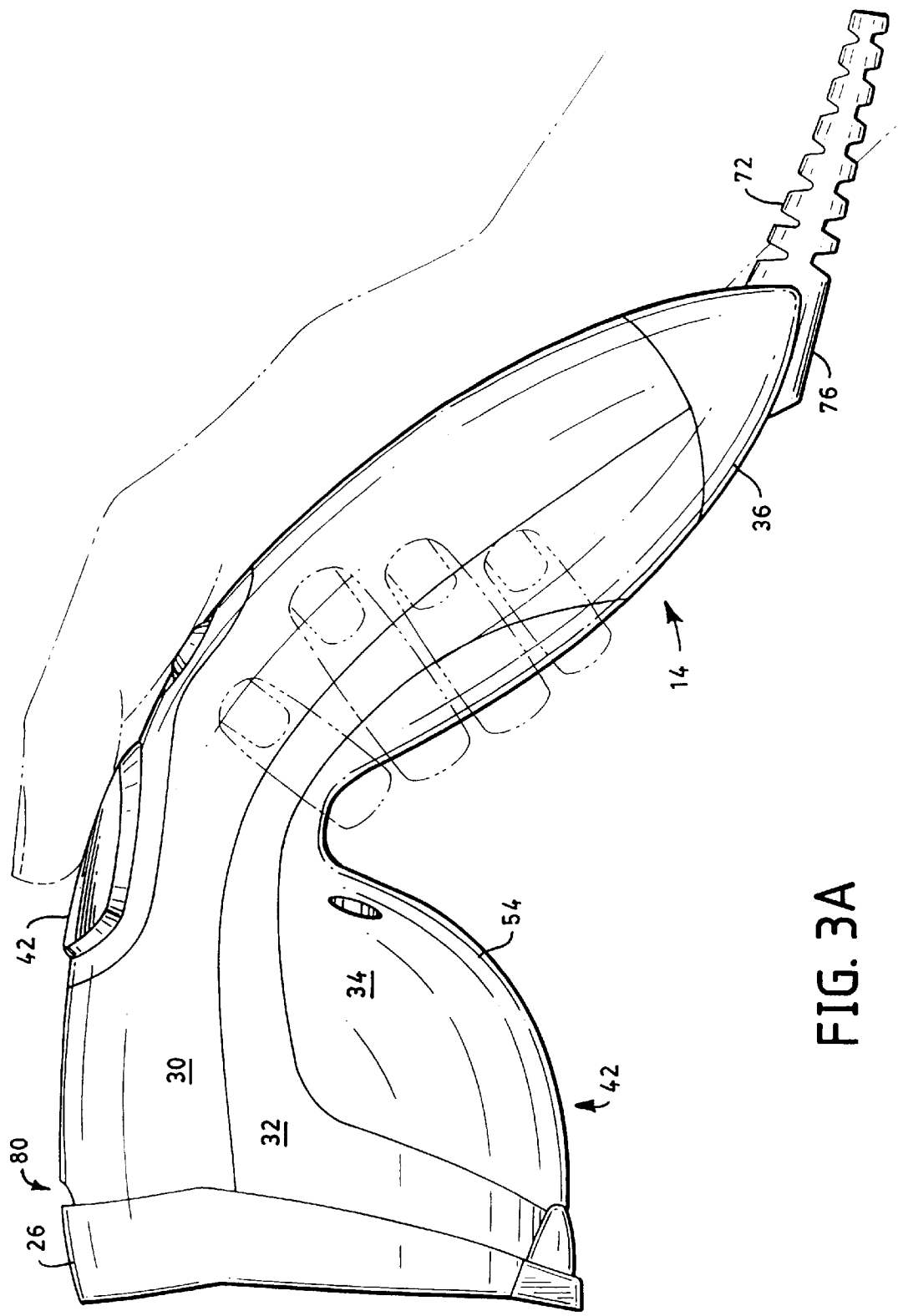
FIG. 3A is a left side elevation view of the imager of FIG. 1; held in a pistol-gripping mode.
Figure 3B:
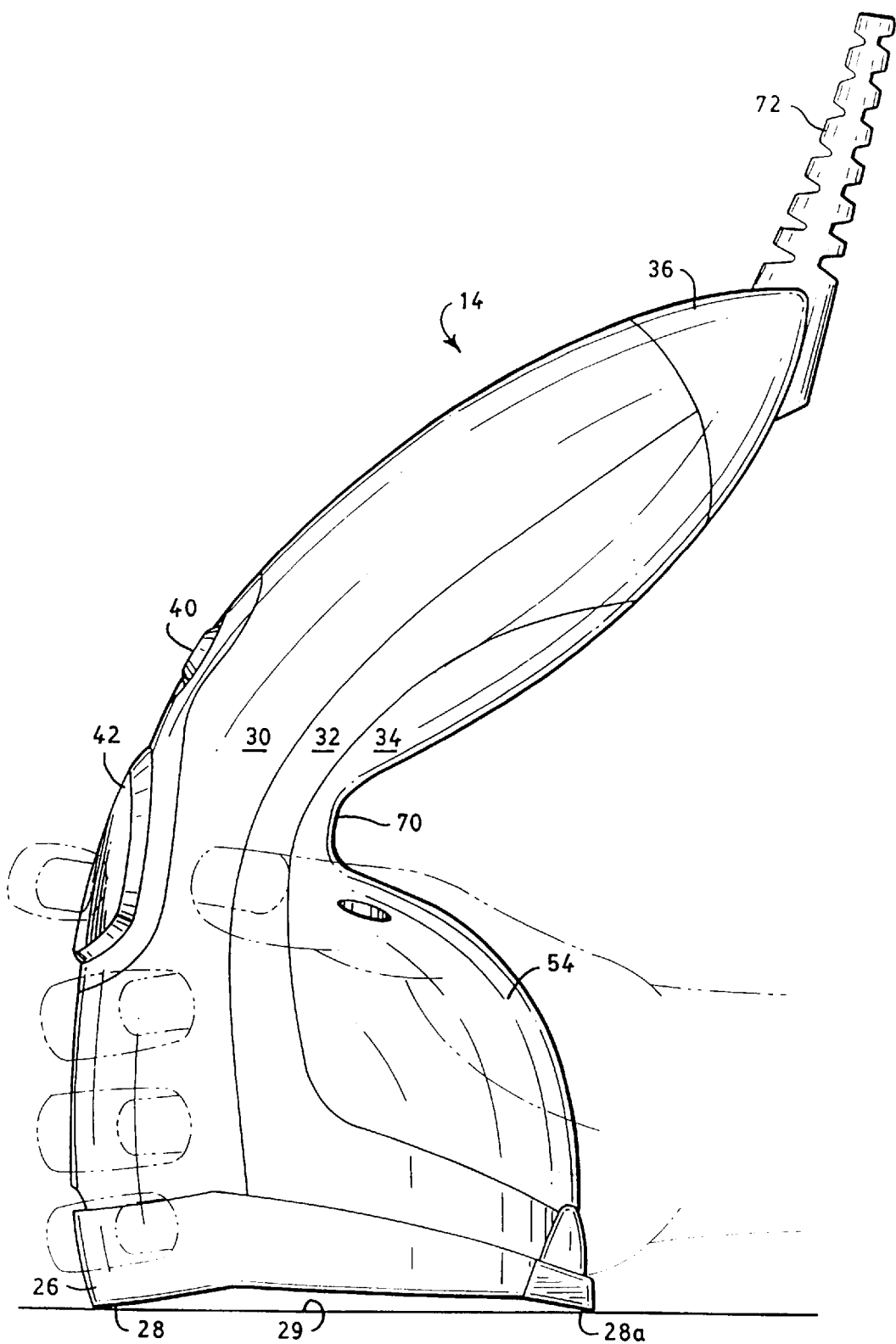
FIG. 3B is a left side elevation view of the imager of FIG. 1, held with the palm of a hand about the head of the imager.
Figure 4:
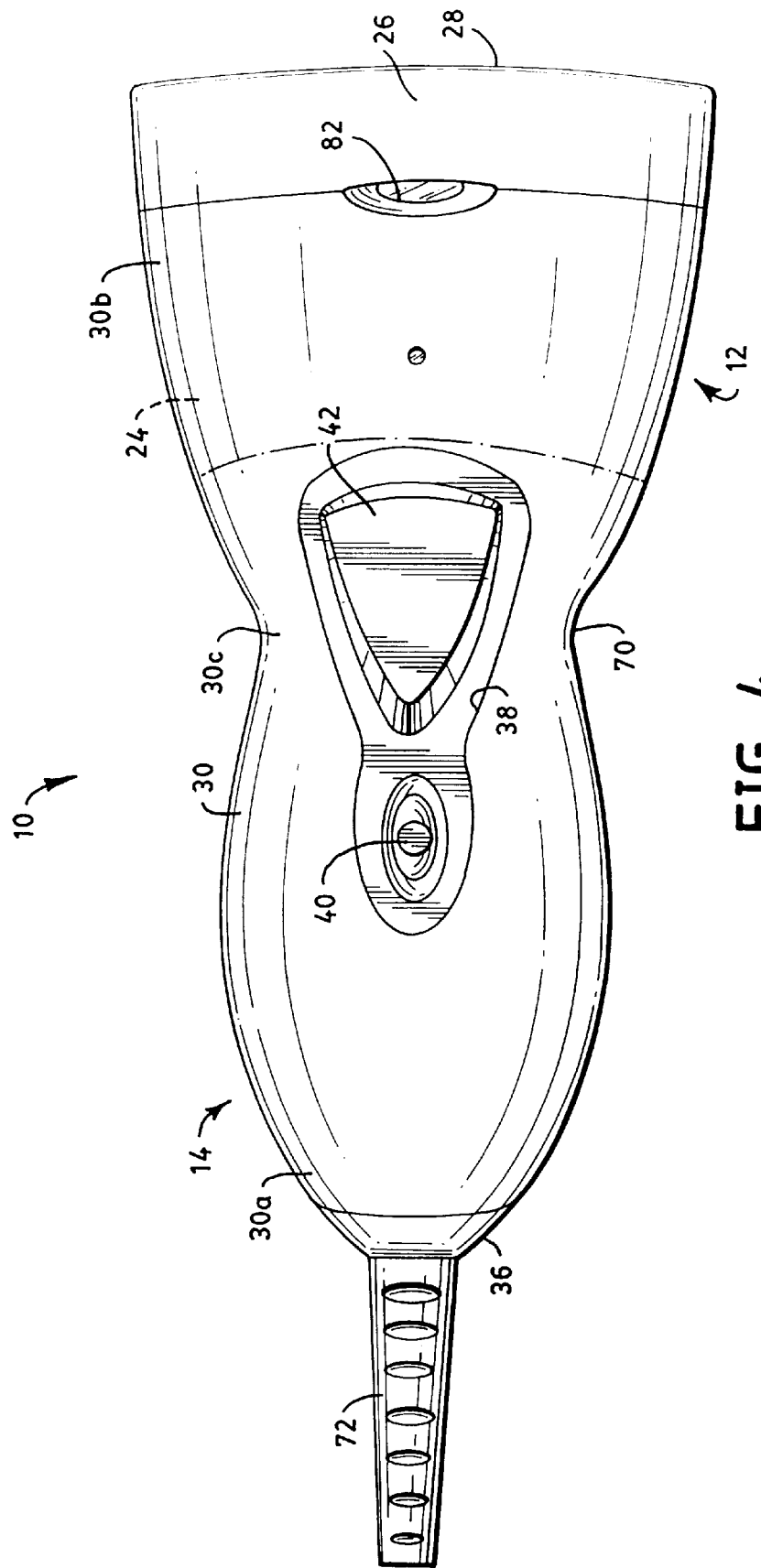
FIG. 4 is a plan view of the imager of FIG. 1.
Figure 5:
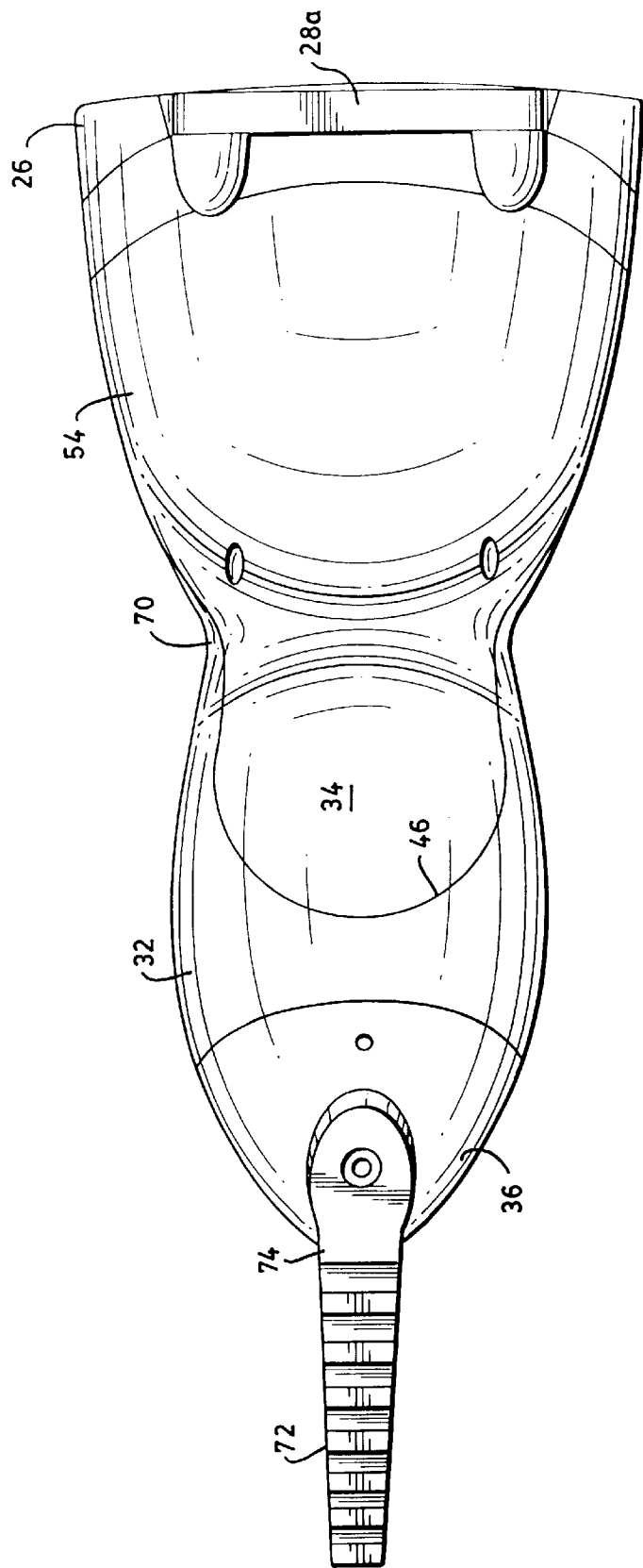
FIG. 5 is a bottom view of the imager of FIG. 1.
Figure 6:
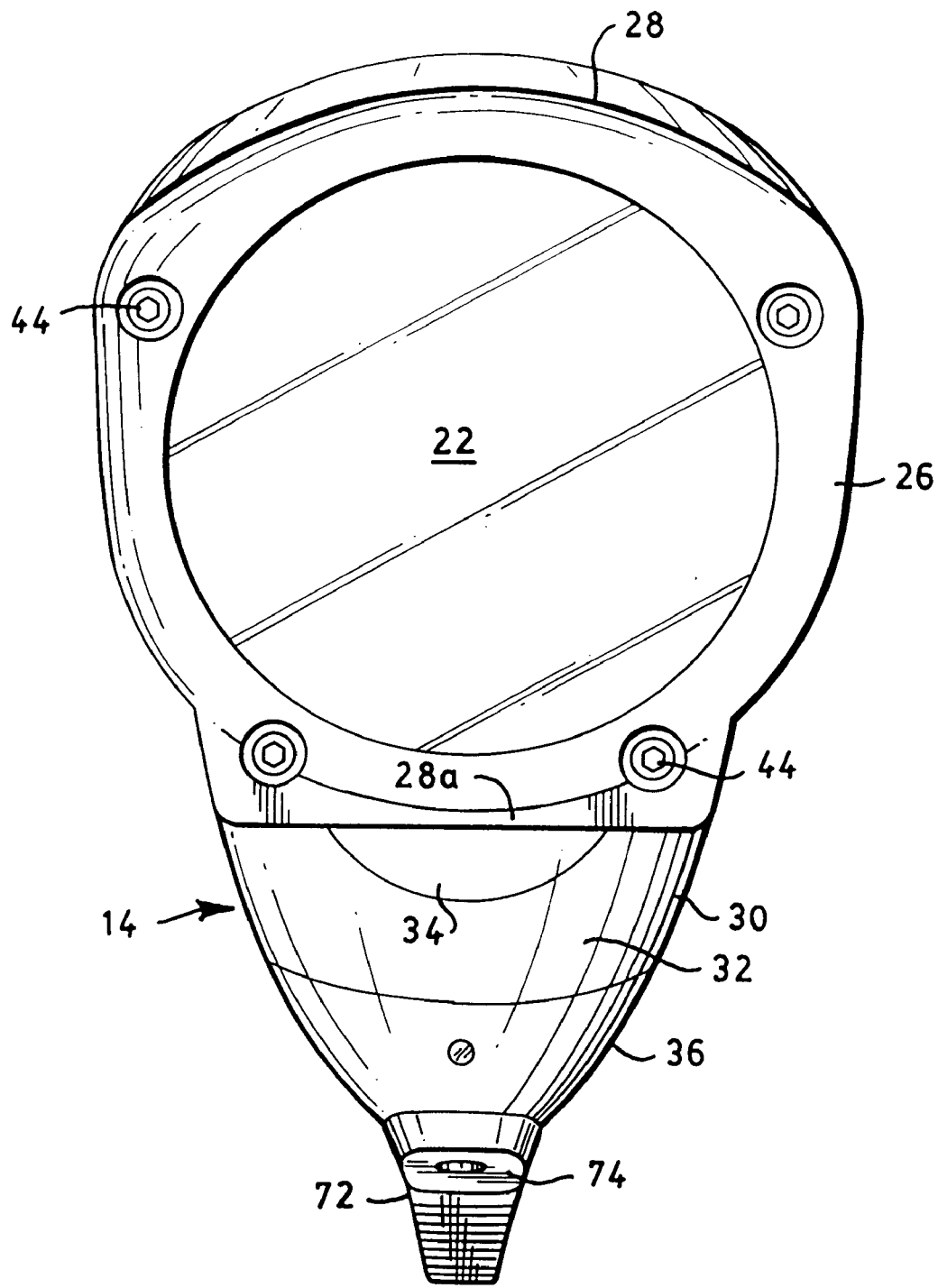
FIG. 6 is a front elevation view of an imager of FIG. 1.
Figure 7:
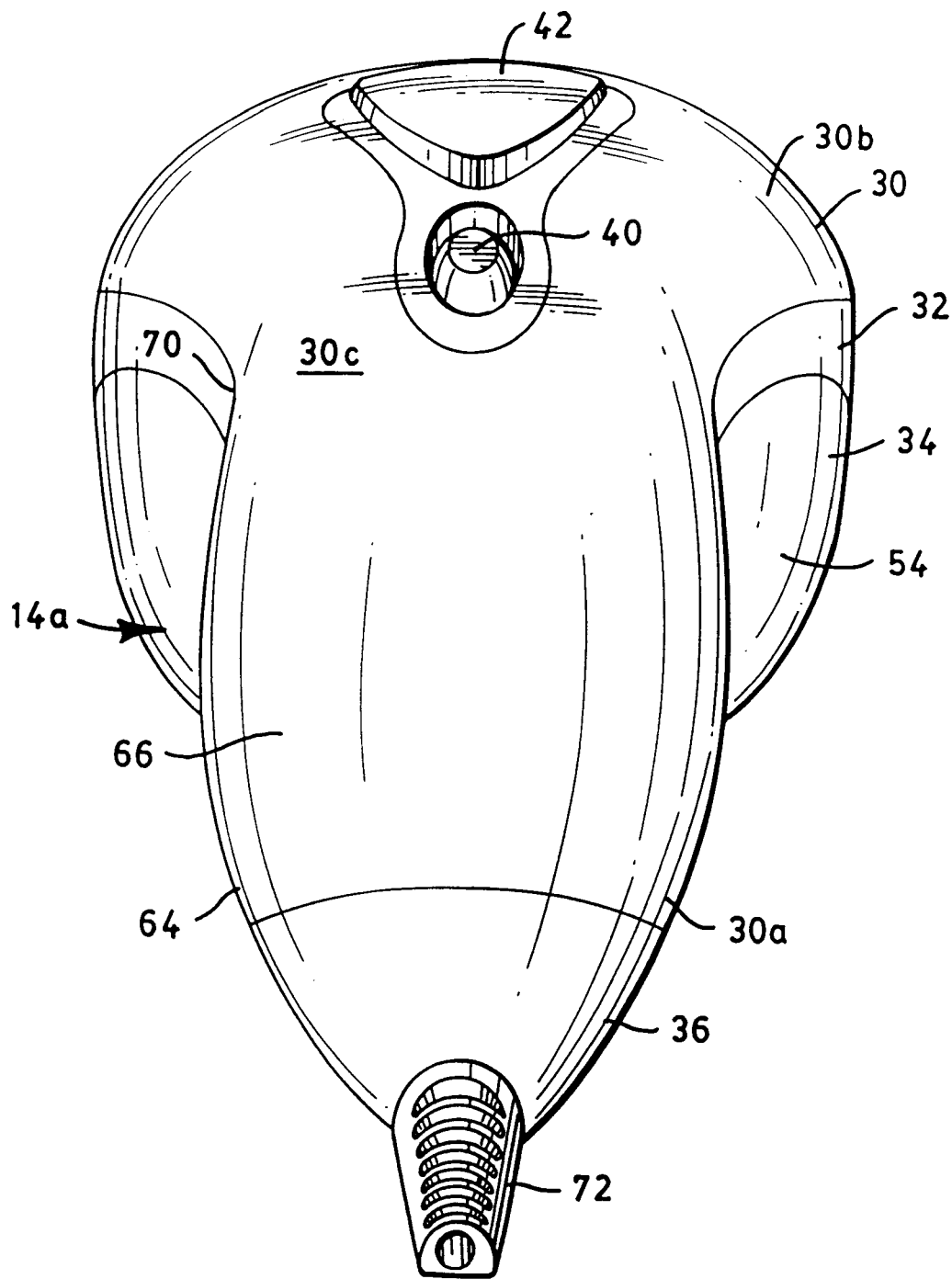
FIG. 7 is a rear elevation view of the imager of FIG. 1.

The housing construction of the present invention is adapted to gripping in multi-modal fashion to accommodate the conduct of a variety of dexterous and frequently repetitive operations. As used herein, "multi-modal" grippability refers to the capacity of a housing or device to be held or gripped in at least two ways. It will be appreciated from the detailed description hereof that the preferred electro-optical reader or imager of FIG. 1 can be gripped in two principal ways, such that the device may be considered at least bimodally grippable. Thus, the device can be gripped in a first (or pistol-grip) fashion, as shown in FIG. 3A, to facilitate the reading of symbologies that may be oriented in a substantially vertical plane in relation to holder. For the facilitation of the reading of symbologies that may be present in a horizontal plane, as in the case, for example, of marked parts present on a table top or like workstation, it will be convenient and efficient from an ergonomic standpoint to cup the device manually in the second of such principal ways, as shown in FIG. 3B. Inasmuch as the device can be gripped in the latter fashion with the hand of the user cupping or encircling the device in a multiplicity of ways about the generally convex section and cup-shaped portion of the device, the device can be considered multi-modally (rather than only bi-modally) grippable.

The hand-held imager 10 is constructed to be portable and is adapted, when operated, to illuminate machine readable symbols on a variety of articles and to then read or decode the reflected illuminations for data collection purposes. As noted, the imager 10 includes a multi-component housing assembly 11 including an electro-optical head portion 12 and integrally connected thereto a generally barrelshaped handle portion 14 having tapering ends which is slanted with respect to the head.

The head portion 12 has a generally convex and hollow construction which as illustrated is cup-shaped with a partially hemispherical shape. The head has an exterior configuration extending rearwardly from the front end thereof and is sized and shaped for facilitating a palm of an operator gripping it from multiple positions. In fact, the head is sized and shaped so as to be held by an operator in cup-like fashion from any position around its periphery. The head portion is constructed with an opening (not shown) in an open front end portion 20 thereof. An optical lens 22 or window is mounted in the front end portion 20 for covering the opening thereby allowing illumination and reading of the machine readable symbologies by the electro-optical assembly generally indicated by reference number 24. Operation of the electro-optical head assembly is described in detail in the aforementioned copending application and thus a detailed description thereof is unnecessary.

The housing assembly 11 includes a multi-component arrangement comprising an end cap 26, a top segment 30, an intermediate segment 32, a bottom segment 34, and an end member 36, all of which are joined together. All the housing components can be made of a variety of materials including the same or different plastics. The type of materials selected can be a function of the type of use envisioned by the imager. The end cap 26 can be made of any suitable polymeric (e.g., elastomeric) material and can be secured as by threaded members to the front end portion 20 and serves to retain the lens 22. The end cap 26 has a pair of forwardly protruding and diametrically opposed edges (28, 28a) that are on the top and bottom of the end cap, respectively. The protruding edges (28, 28a) lie within a common plane for supporting, in a stable fashion, the hand-held imager when rested on a generally planar support surface 29 with the handle in a vertical orientation.

The segments extend generally flush from the distal end member 36 to the end cap 26. The top segment 30 has a relatively narrower portion 30a adjacent the end member 36 and a relatively enlarged portion 30b adjacent the front-end portion which encompasses a portion of the end cap and a relatively narrower intermediate portion 30c between the portions 30a and 30b. An opening 38 is formed in the intermediate portion 30c and, preferably, holds two separately actuatable finger depressible switches 40 and 42. Both the switches 40 and 42 are coupled to the electro-optical head assembly 24 and are actuated by depression thereof in different modes. While a pair of switches is illustrated, one or more can be provided. Clearly, the present invention envisions not only other types of switches, but the addition of other finger actuatable components which need not be connected to the electro-optical system. Each of switches 40 and 42 serves to actuate the system to commence illuminating and reading operations. The switches 40 and 42 are in close proximity to each other and are positioned to accommodate the user, and particularly, the manner in which the reader is held. For example, a user may find it convenient to actuate either of switches 40 and 42 when, for instance, the handle is held in pistol-grip fashion by the operator, such as when performing vertical reading. The switches can be operated by the thumb and/or forefinger, for example, when the cup-shaped and generally convex section of the imager head is cupped into the hand, as when doing generally horizontal data collecting. Fastening members 44 secure the end cap 24 to the front-end portion 20.

The intermediate segment 32 has a distal end encompassing, in flush relationship, a portion of the periphery of the end member 36 and extends to and is in flush relationship to a top portion of the end cap 26. The intermediate segment 32 includes an elongated and contoured opening 46 having the appearance shown in the drawings and which receives in flush relationship the bottom segment 34. A pair of threaded members (not shown) are received within openings 48 and secure the bottom and intermediate segments together with the top segment, whereby such segments form a contoured housing configuration having the head and handle construction to be described. The fastener 50 secures the end cap member 36 to the top segment 30. The fastener 50 can be used for securing a tether or some other device to the imager.

The bottom segment 34, closes the opening 46 and as noted, is mounted in a flush relationship to the intermediate segment 32. The bottom segment 34 includes a generally convex section 54 and a handle section 56. The convex section 54 is geometrically sized and shaped, whereby an operator can securely grip it in multiple positions into the palm for data-collection purposes. Advantageously, this provides for enhanced flexibility in holding the device with a secure grip. It forms a major gripping segment or portion for the palm of an operator's hand which is generally opposed to the handle. In fact the top, intermediate and bottom segments when joined together define the hollow and generally convex head portion 12 which is configured and sized to allow an operator's hand to grip it from any circumferential position. Advantageously, this allows manipulation, for generally horizontal data collecting. In this embodiment, given the operating characteristics of electro-optical system including beam width, one would hold (palm) the head when collecting data positioned, for example, at a distance of about 1.5 inches to about 7 inches from the head.

The handle section 56 is contoured to be flush with the intermediate segment 32 so as to complete formation of the handle portion 14. The handle section 14 has an elongated longitudinal axis 60 which intersects a medial plane 62 of the head portion 14 at an angle as is illustrated. It will be appreciated that this angle of intersection can vary consistent with the principles of the present invention. Generally, however, the angle should be selected so that the hand-held imager 10 can be held as a pistol for effecting a generally vertical reading operation by the operator. In this embodiment, given the operating characteristics of the electro-optical system, including beam width, one would hold the handle when collecting data, for example, at a distance of about 4 to 18 inches from the head. One reason for the angle being so arranged is that the end member and the end cap can rest on a support surface 75 as well as generate sufficient space for an operator to insert a hand between the head and end member thereby facilitating grasping and lifting of the imager. Good results can be obtained when such angle is about 125 degrees, although other angles that permit the reader to rest in the aforedescribed manner can be employed. In addition, the length of the handle can be varied to achieve the foregoing or be of longer or shorter lengths for a variety of purposes. In this preferred embodiment, the grippable convex portion is formed to be on one side of the medial plane 62 so that the handle is asymmetrically oriented with respect thereto so that if the imager is supported on the head the handle will extend from a rear surface of the head at an angle with respect thereto. For facilitating ergonomic use, the handle portion 14 has a downwardly tapering section 64 at its distal end, an intermediate portion 66 which is enlarged with respect to the ends but still enables the user to grasp it as well as a downwardly tapering proximal portion 68 that has a contoured relationship with the head 12. The proximal portion 68 serves as grippable neck 70. The grippable neck 70 is sized and contoured whereby its transverse cross-section allows an operator to insert a thumb or index finger at a bottom surface of the imager between the convex section 54 and the handle section 56, as well as to allow other fingers of the same hand to engage the switches 40 and 42 at the front of the imager. The transverse cross-section of the neck is, preferably smaller than that of the intermediate section and this facilitates a more secure holding of the imager because the handle can rest on the user's hand. In this arrangement, the switches are located opposite the top surface for convenience in allowing manipulation thereof when the operator uses the palm of a hand to cup the head portion.

While the illustrated embodiment discloses one version of a palm grippable head and handle for an imager, the present invention envisions that other generally convex and palm grippable heads can be used as well as palm grippable handle configurations so long as the construction is consistent with the principles of the present invention.

A flexible coupling 72 is secured to the end member 36 which is connected to a cable that is coupled from the imager to a microprocessor or the like as is described in the last-noted patent application. The flexible coupling 72 and the end member 36 define a common supporting surface 74 which falls in the plane of a supporting surface 76 on the front edge. In this particular manner, the hand-held imager 10 can be rested on a planar structure (FIG. 2), and supported stably by the supporting surfaces 74 and 76. In addition when so supported the operator can readily insert the hand and lift the imager for use.

If desired, coupling 72 can be eliminated in the case of an imager containing a radio frequency (RF) module for communication with a remote computer station.

A visual indicator 80 in the form of a plastic transparent piece 82 is provided on the top segment 32 at the interface between the end cap and head portion. The piece 82 is in optical communication with the interior of imager behind the lens 22. This arrangement allows visual indications, such as the flashing of lights which the imager can perform, to be observed by the operator through the transparent piece 82. Within the spirit and scope of the invention other types of visual and audio indicators are contemplated.

In operation, the imager is versatile in that it can be used for easy and ergonomically efficient reading of data oriented in generally horizontal and vertical planes in relation to the optically transmissive window at the leading end portion of the head of the imager. Thus, in a method aspect of the invention, the imager can be held in the first of two principally bimodal fashions for the reading of data present in a first plane. Then, for the reading of data present in a second plane substantially orthogonal to the first plane, the imager can be held in the second of such principally bimodal fashions, with the window directed toward such data. Holding of the imager in these bimodal fashions, and alternatingly as data appears in planes that may alternate orthogonally, facilitates ergonomic usage since it tends to minimize ulnar or wrist deviation, flexion or both and reduces the need for raising of the elbow. This reduction is achievable if the operator is standing or sitting. A significant lessening of wrist bending is also experienced with the horizontal reading which is of significance with poorly located targets. If generally vertical reading is to be performed, the handle can be gripped in pistol fashion. Reading in this mode is preferred when the machine readable symbologies are from about 4 to 18 inches. It has been determined that the hand-held imager 10 tends to minimize discomfort, fatigue and potential injury attributable to repetitive uses and functions in an ergonomically efficient manner with improved versatility of operation. Thus, the hand-held imager is significantly improved over other similar devices.

Although the present invention has been described by reference to a hand-held imager, the present invention makes possible the production of a variety of portable hand-held devices that can be used with mitigation or alleviation of the physical fatigue and stresses that an operator may encounter when using a device that is used typically in varying hand-held positions and oftentimes for the performance of repetitive tasks. Air blowers for the drying of parts, paint-spraying devices and sanders are examples of devices that can benefit from the ergonomic features of the subject housing construction.

Although several embodiments of the present invention have been shown and described above, it will be understood that the invention is not limited to these specific embodiments, but rather is defined by the appended claims.

What is claimed is:

1. A hand-held device which enhances ergonomic multi-modal gripping thereof, the device comprising: a head; and, a generally elongate handle assembly having a proximal portion coupled to a rear wall of the head to define a neck grippable by thumb and index fingers of an operator and a distal end extending away from the head, the head having an exterior configuration extending rearwardly from the front end which is sized and shaped for facilitating the cupping and holding of the head by an operator.

2. The device of claim 1 wherein an exterior of the head is grippable from multiple positions around its periphery.

3. The device of claim 1 wherein the head includes a generally convex exterior configuration and has a major gripping segment which extends from the neck and is generally opposed to the handle.

4. The device of claim 3 wherein the major gripping segment is located to be generally on one side of a medial plane extending through the head.

5. The device of claim 1 wherein the handle includes a barrel portion having a transverse cross-section at the proximal end for defining the neck which is smaller than a transverse cross-section of an intermediate portion thereof.

6. The device of claim 5 wherein the handle tapers downwardly from the intermediate portion to a distal end thereof.

7. The device of claim 1 wherein the handle is slanted with respect to the head and extends from the rear of the head portion on a side of the medial plane which is opposite the major gripping portion.

8. The device of claim 1 wherein the generally convex section includes a generally cup-shaped configuration.

9. The device of claim 1 wherein the handle and neck portion are contoured to the head portion.

10. A hand-held data-collection apparatus for illuminating machine readable coded information and imaging the reflected illumination, comprising: an optical illuminating head including an optically transmissive window at a leading end portion thereof; means operable for illuminating and/or optically reading symbology through the transmissive window; and, an elongate handle having a proximal portion coupled to a rear wall of the head to define a neck grippable by thumb and index fingers of an operator and a distal end extending away from the head, the head having an exterior configuration extending rearwardly from the front end which is sized and shaped for facilitating the cupping and holding of the head by an operator.

11. The apparatus of claim 10 wherein an exterior of the head is grippable from any position around its periphery.

12. The apparatus of claim 10 further includes at least a first switch element on one of the head and the handle, the first switch element being actuatable by a finger of an operator.

13. The apparatus of claim 10 wherein the exterior of the head includes a generally convex exterior shape having a major gripping segment which extends from the neck and is generally opposed to the handle.

14. The apparatus of claim 10 wherein the major gripping segment is located to be generally on one side of a medial plane extending through the head.

15. The apparatus of claim 10 wherein the handle tapers downwardly from the intermediate portion to a distal end thereof.

16. The apparatus of claim 15 further including a first supporting surface at the distal end of the handle and a second supporting surface on the a leading edge of the head; wherein the first and second supporting surfaces are able to support the imager on a surface in a manner whereby the handle can be grasped by an operator.

17. The apparatus of claim 13 wherein the generally convex section includes a generally cup-shaped configuration.

18. The apparatus of claim 10 wherein the handle and neck are contoured to the head portion.

19. A method of manipulating a hand-held device comprising a head, and a generally elongate handle having a proximal portion coupled to a rear wall of the head to define a neck grippable by thumb and index fingers of an operator and a distal end extending away from the head, the head having a leading end portion and an exterior configuration extending rearwardly from the front end which is sized and shaped for facilitating the cupping and holding of the head by an operator; the method comprising the steps of: holding said hand-held device by gripping said handle when directing said leading end portion toward a first plane; and holding said hand-held device by the cupping of said head when directing said leading end portion toward a second plane substantially orthogonal to said first plane.

20. The method of claim 19 further comprising the steps of alternatingly holding said device according to said gripping and cupping steps alternatingly with changes in said first and second planes.

* * * * *